(12) United States Patent
Moine et al.

(10) Patent No.: US 12,496,563 B2
(45) Date of Patent: Dec. 16, 2025

(54) VACUUM LINE AND METHOD FOR CONTROLLING A VACUUM LINE TO REDUCE EXPLOSION POTENTIAL VIA INJECTION OF DILUENT GAS TO LOWER FLAMMABLE GAS CONCENTRATION

(71) Applicant: PFEIFFER VACUUM, Annecy (FR)

(72) Inventors: Pascal Moine, Annecy (FR); Thierry Neel, Annecy (FR)

(73) Assignee: PFEIFFER VACUUM, Annecy (FR)

( * ) Notice: Subject to any disclaimer, the term of this patent is extended or adjusted under 35 U.S.C. 154(b) by 490 days.

(21) Appl. No.: 18/004,252

(22) PCT Filed: Jun. 23, 2021

(86) PCT No.: PCT/EP2021/067177
§ 371 (c)(1),
(2) Date: Jan. 4, 2023

(87) PCT Pub. No.: WO2022/008249
PCT Pub. Date: Jan. 13, 2022

(65) Prior Publication Data
US 2023/0294053 A1    Sep. 21, 2023

(30) Foreign Application Priority Data
Jul. 9, 2020    (FR) ...................................... 20 07251

(51) Int. Cl.
*B01F 35/221* (2022.01)
*B01D 53/14* (2006.01)
(Continued)

(52) U.S. Cl.
CPC .......... *B01F 35/2211* (2022.01); *B01D 53/14* (2013.01); *B01F 23/191* (2022.01);
(Continued)

(58) Field of Classification Search
CPC .......... B01F 25/31243; B01F 25/31252; B01F 2025/911; B01F 2025/917;
(Continued)

(56) References Cited

U.S. PATENT DOCUMENTS

2006/0118178 A1    6/2006    Desbiolles et al.
2010/0038230 A1    2/2010    Radoiu et al.
(Continued)

FOREIGN PATENT DOCUMENTS

EP            1 669 609 A1    6/2006
WO    WO-2023104476 A1 *    6/2023    ............ F04C 23/005
WO    WO-2023104639 A1 *    6/2023    .............. F04C 25/02

OTHER PUBLICATIONS

International Search Report & Written Opinion issued Jul. 30, 2021 in PCT/EP2021/067177 filed on Jun. 23, 2021, 12 pages.
(Continued)

*Primary Examiner* — Charles Cooley
(74) *Attorney, Agent, or Firm* — Oblon, McClelland, Maier & Neustadt, L.L.P.

(57) ABSTRACT

A vacuum line and method for controlling a vacuum line in which an auxiliary pumping device and a diluent gas injection device are controlled according to a first operating mode in which the pressure prevailing in the discharge pipe is maintained at less than or equal to 20,000 Pa or according to a second operating mode in which the pressure prevailing in the discharge pipe is greater than 20,000 Pa, and the injection of a diluent gas into the stream of the pumped gases is controlled, downstream of an intake of the rough pumping device, such as into the discharge pipe and/or into the rough pumping device and/or into the auxiliary pumping device by the diluent gas injection device in the second operating
(Continued)

mode. This reduces the potential for explosion in the vacuum line via injection of diluent gas to lower flammable gas concentration.

19 Claims, 3 Drawing Sheets

(51) Int. Cl.
    *B01F 23/10*     (2022.01)
    *B01F 25/30*     (2022.01)
    *B01F 35/21*     (2022.01)

(52) U.S. Cl.
    CPC .......... B01F 25/30 (2022.01); B01F 35/2113 (2022.01); *B01F 2215/0468* (2013.01)

(58) Field of Classification Search
    CPC ...... B01F 25/312521; B01F 25/312533; B01F 25/32; B01F 25/31242; B01F 2025/9171; B01F 25/312531; B01F 35/2211; B01F 23/191; B01F 25/30; B01F 35/2113; B01F 2215/0468; F16L 27/0812; B01D 53/14; F04C 23/006; F04C 18/126; F04C 2220/30; F04C 2240/81; F04C 2270/185; F04C 29/0014; F04C 29/0092; F04C 25/02; F04C 2280/02
    USPC ......... 366/173.1, 174.1, 175.2, 181.8, 182.4, 366/182.2, 163.1, 163.2, 167.1, 176.1, 366/337, 181.5; 137/888–896; 239/1–754; 285/145.2, 147.1, 148.4, 285/275–276, 282
    See application file for complete search history.

(56) References Cited

U.S. PATENT DOCUMENTS

| | | | |
|---|---|---|---|
| 2010/0229626 A1* | 9/2010 | Tunna | G01N 25/28 73/23.31 |
| 2011/0005607 A1 | 1/2011 | Desbiolles et al. | |
| 2015/0068399 A1 | 3/2015 | Koesters et al. | |
| 2017/0350395 A1 | 12/2017 | Schofield et al. | |
| 2018/0003178 A1 | 1/2018 | Schofield et al. | |
| 2020/0408211 A1 | 12/2020 | Koesters et al. | |
| 2022/0120279 A1* | 4/2022 | Decorde | F04C 25/02 |
| 2023/0249118 A1* | 8/2023 | Beaujon | G08B 21/182 422/110 |
| 2023/0294053 A1* | 9/2023 | Moine | B01D 53/14 366/101 |

OTHER PUBLICATIONS

Japanese Office Action issued Dec. 17, 2024, in corresponding Japanese Patent Application No. 2023-501032 (with Partial English Translation), 8 pages.

* cited by examiner

VACUUM LINE AND METHOD FOR CONTROLLING A VACUUM LINE TO REDUCE EXPLOSION POTENTIAL VIA INJECTION OF DILUENT GAS TO LOWER FLAMMABLE GAS CONCENTRATION

The present invention relates to a vacuum line and a method for controlling a vacuum line.

In the semi-conductor, flat panel display and photovoltaic manufacturing industry, manufacturing methods use gases that, after passing through the rough vacuum pumps, are generally treated by gas treatment devices.

Some of these methods are said to be risky, as the gases conveyed in the vacuum lines are flammable and/or explosive. By way of example, mention can be made of hydrogen, silane, TEOS and hydrides.

In addition to these hazardous gaseous species, there can also be deposits of reduced solid species in the vacuum lines, that is, non-oxidized, such as silicon dust or polysilane polymers. These deposits can accumulate over time and promote the emergence of additional hazardous conditions. Some non-oxidized deposits are highly flammable. They can ignite, notably for example due to the sudden pumping of a strong gas stream or simply due to the venting of the pipes or vacuum pumps by the operators during maintenance.

Some explosions can be particularly destructive due to the very large amount of energy released. This is notably the case for chain explosions. A first explosion is firstly initiated by flammable gases. This explosion stirs up deposits of reduced solid species that are potentially present in the pipes. These flammable solid deposits stirred up by the shock wave from the explosion explode in turn in a "super-explosion".

The risk of personal injury and damage to devices is therefore very high.

The method currently used in response to this problem is to continually dilute the pumped gases with a neutral gas, generally nitrogen. The neutral gas flow rate is determined so that it can respond to the least favourable pumping situations, plus a safety margin.

This solution has a number of drawbacks, however.

Firstly, the significant supply of nitrogen in the vacuum line involves additional costs linked to the gas consumption and also the energy consumption of the vacuum pump, the heating device and the gas treatment device for treating the significant streams of diluted gas. In addition, the cooling of the vacuum lines caused by the dilution of the gases results in other drawbacks, notably due to the cost of the heating elements and the risk of failures. This significant supply of neutral gas also requires the overrating of the gas treatment devices and the rough pumping devices.

The diluent nitrogen additionally results in the formation of nitrogen oxides or "$NO_x$", such as $NO_2$, in the gas treatment devices. Nitrogen oxides are toxic and constitute atmospheric pollutants that must in turn be treated.

Finally, it has been observed that this solution is reaching its limits as for some recent processes, the increase in diluent gas is becoming insufficient, either because the vacuum pump has insufficient pumping capacity, or because the gas treatment device has insufficient treatment capacity. In these extreme operating conditions, problems relating to the reliability of the vacuum pump or the gas treatment device can arise.

Another solution could be to lower the temperature of the pipes and the vacuum pumps, notably to prevent the thermal decomposition of the precursors and minimize the chemical reactions. However, it is also important to maintain high temperatures in order to prevent risks of deposition by condensation.

Another problem is the tendency of some manufacturing processes, notably in the semi-conductor industry, to use increasingly unstable precursors. The substrate patterns are increasingly thin and the substrates are increasingly thick, that is, they have many layers produced in many process steps. In order to lower the heat balance, which risks damaging the chips of the substrates, new generations of molecule that decompose at lower temperatures are used. The drawback is that they are also deposited more easily in the vacuum line, which can result in significant deposits.

In addition, some used condensable gaseous species can solidify into solid by-products and be deposited, notably in the form of layers, on the moving or static parts of the vacuum pumps or pipes, which can lead to the clogging of the lines.

One aim of the present invention is to increase the safety of the pumping devices and vacuum lines that convey flammable and/or explosive gases. Another aim is to reduce the presence of deposits of condensable species or to delay/minimize the decomposition of precursors that decompose at lower temperatures, in the discharge pipes and in the pumping devices.

To this end, the invention relates to a vacuum line comprising:
- a pumping device including at least one rough pumping device configured to be able to discharge the pumped gases at atmospheric pressure,
- a gas treatment device comprising
  - a treatment chamber configured to treat, at atmospheric pressure, the gases pumped by the rough pumping device, and
  - a discharge pipe connecting a discharge of the rough pumping device to an inlet of the treatment chamber,
characterized in that the gas treatment device includes:
- at least one auxiliary pumping device configured to lower the pressure in the discharge pipe,
- a diluent gas injection device configured to inject a diluent gas into the stream of the pumped gases, downstream of an intake of the rough pumping device, such as into the discharge pipe and/or into the rough pumping device and/or into the auxiliary pumping device, the vacuum line further including:
  - a pressure sensor configured to measure the pressure prevailing in the discharge pipe, and
  - a control unit configured to control the auxiliary pumping device and the diluent gas injection device according to a first operating mode in which the pressure prevailing in the discharge pipe is maintained at less than or equal to 20,000 Pa (200 mbar) or according to a second operating mode in which the pressure prevailing in the discharge pipe is greater than 20,000 Pa (200 mbar), the control unit being configured to control the injection of a diluent gas by means of the diluent gas injection device in the second operating mode.

The diluent gas injection device is for example configured to inject a diluent gas into the discharge pipe and/or into the rough pumping device and/or into the auxiliary pumping device.

In the first operating mode, which is the optimum operating mode, by default, the pressure is thus maintained below the ignition conditions of the flammable gases conveyed in the discharge pipe. In the second operating mode, the risk of flammability can be managed by dilution. Lowering the pressure in the discharge pipe thus makes it possible to limit the injection of diluent gas to the most critical situations. Diluent gas consumption can therefore be reduced while having safe operating conditions. It must also be noted that in the second operating mode, the quantity of diluent gas used is low compared with the quantities injected according to the prior art.

As well as making the vacuum line safe, at the same time, lowering the pressure makes it possible to prevent deposits of the condensable species in the discharge pipe and in the rough pumping device, which makes it possible to reduce the heating requirements of the lines. Lowering the heating of the lines makes it possible to prevent thermal decomposition and thus reduce the conversion of the precursors in the rough pumping device and the kinetics of the chemical activity, which makes it possible to reduce undesirable reactions. Lowering the heating also makes it possible to preserve the quality of the lubricants and improve the reliability of the mechanical parts of the rough pumping device, notably the bearings. The intervals between maintenance operations can therefore be increased.

In addition, the consumption of diluent gas is limited, which also makes it possible to reduce the energy consumption of the rough pumping device and of the gas treatment device and to minimize, or even eliminate, the formation of nitrogen oxides in the gas treatment device.

Lowering the pressure in the vacuum line also reduces the pressure in the rough pumping device, which makes it possible to reduce the size thereof and to use less strong, and therefore cheaper, materials.

The vacuum line can further comprise one or more of the features described hereinafter, taken alone or in combination.

The control unit can be configured so that the flow rate of the diluent gas introduced into the stream of the pumped gases, downstream of an intake of the rough pumping device, such as into the discharge pipe and/or into the rough pumping device and/or into the auxiliary pumping device in the second operating mode is determined as a function of the pressure measured by the pressure sensor and as a function of information about the flammable gases to be pumped so that the pressure generated by an ignition remains below 160,000 Pa (1,600 mbar), notably in the most severe conditions in the event of an explosion, such as in stoichiometric conditions.

The diluent gas can include a fuel and/or a neutral gas.

The control unit can be configured to determine the quantities and proportions of fuel and neutral gas as a function of information about the flammable gases introduced into the process chamber.

The control unit can be configured to control the injection of a high flow rate of diluent gas into the stream of the pumped gases, downstream of an intake of the rough pumping device, such as into the discharge pipe and/or into the rough pumping device and/or into the auxiliary pumping device when the pressure measured exceeds 50,000 Pa (500 mbar).

The high diluent gas flow rate can be predetermined so that the flammable gas concentration is less than 25% of the lower explosive limit (LEL). The most unfavourable pumping situations are thus made safe, plus a safety margin. This is an emergency operating mode, used occasionally in extreme circumstances, similar to permanent practice in the prior art, which resulted in excessive nitrogen consumption in the prior art. Maximum dilution is therefore occasional.

The control unit can be configured to switch off the injection of the purging gas into the rough pumping device in the first operating mode.

The auxiliary pumping device can include a water jet pump and/or a Venturi gas jet pump and/or a liquid ring pump and/or a dry vacuum pump and/or a vane pump.

The treatment chamber can include a burner and/or an electric system and/or a plasma and/or a scrubber and/or a chemisorption and/or physisorption cartridge.

The auxiliary pumping device can include a Venturi gas jet pump the driving gas of which includes a fuel and/or a comburent and/or a neutral gas.

The auxiliary pumping device can be configured to determine the quantities and proportions of fuel, comburent and neutral gas of the driving gas a function of information coming from the process chamber.

The Venturi gas jet pump can include a heating element configured to heat the driving gas.

The auxiliary pumping device can be situated less than 1 metre from the inlet of the gas treatment chamber, such as less than 50 cm.

The auxiliary pumping device can include a water jet pump and a hydraulic pump an inlet of which is placed in communication with a liquid of a bath of a scrubber of the gas treatment device and an outlet of which is configured to be controlled by the control unit in order to supply the water jet pump with driving liquid.

The vacuum line can include a bypass pipe configured to bypass the auxiliary pumping device in the event of overpressure.

The invention also relates to a method for controlling a vacuum line as described above, in which the auxiliary pumping device and the diluent gas injection device are controlled according to a first operating mode in which the pressure prevailing in the discharge pipe is maintained at less than or equal to 20,000 Pa (200 mbar) or according to a second operating mode in which the pressure prevailing in the discharge pipe is greater than 20,000 Pa, and the injection of a diluent gas into the stream of the pumped gases is controlled, downstream of an intake of the rough pumping device, such as into the discharge pipe and/or into the rough pumping device and/or into the auxiliary pumping device by means of the diluent gas injection device in the second operating mode.

Further features and advantages of the invention will become apparent from the following description, given by way of non-limiting example, with reference to the appended drawings, in which.

In these figures, identical elements bear the same reference numbers.

The following implementations are examples. Although the description refers to one or more embodiments, this does not necessarily mean that each reference relates to the same embodiment or that the features apply only to a single embodiment. Individual features of different embodiments can also be combined or interchanged to provide other embodiments.

Rough vacuum pump is given to mean a positive displacement vacuum pump that is configured to take in, transfer and then discharge a gas to be pumped at atmospheric pressure. The rotors of the rough vacuum pump can be of the Roots, claw, screw, vane or scroll type. A rough vacuum pump is also configured to be able to be started at atmospheric pressure.

A positive displacement vacuum pump configured to take in, transfer and then discharge a gas to be pumped using two Roots rotors is defined as a Roots, or Roots blower, vacuum pump. The Roots vacuum pump is mounted upstream of and in series with a rough vacuum pump. The rotors are held by two shafts rotated by a motor of the Roots vacuum pump.

The Roots vacuum pump mainly differs from the rough vacuum pump in that it has larger pumping stage dimensions due to the higher pumping capacities, and larger tolerances, and in that the Roots vacuum pump cannot discharge at atmospheric pressure, but must be used mounted in series upstream of a rough vacuum pump.

An "upstream" element is given to be one that is positioned before another in relation to the direction of flow of the pumped gases. By contrast, a "downstream" element is given to be one that is positioned after another in relation to the direction of flow of the pumped gases. The stream of the pumped gases denotes the gases conveyed by pumping operations in the pipes of the vacuum line.

An installation 1 includes an apparatus 2 comprising one or more process chambers 3 connected to one or more vacuum lines 4. The process chamber 3 is suitable for receiving one or more substrates, such as a semi-conductor wafer or a flat panel display or a photovoltaic panel.

A vacuum line 4 includes one or more pumping devices 5 connected to at least one process chamber 3, one or more gas treatment devices 6 that include one or more discharge pipes 7 connecting the discharge 8 of at least one rough pumping device 10 to an inlet 9 of a treatment chamber 26 of a gas treatment device 6. By way of example in FIG. 1, a semi-conductor apparatus 2 is shown, a process chamber 3 of which is connected to a vacuum line 4. The discharge pipes 7 can be of varying lengths. Between the output of the rough pumping device 10 and the input 9 of the treatment chamber 26, they can have a length of between one and four metres.

Figure 1:
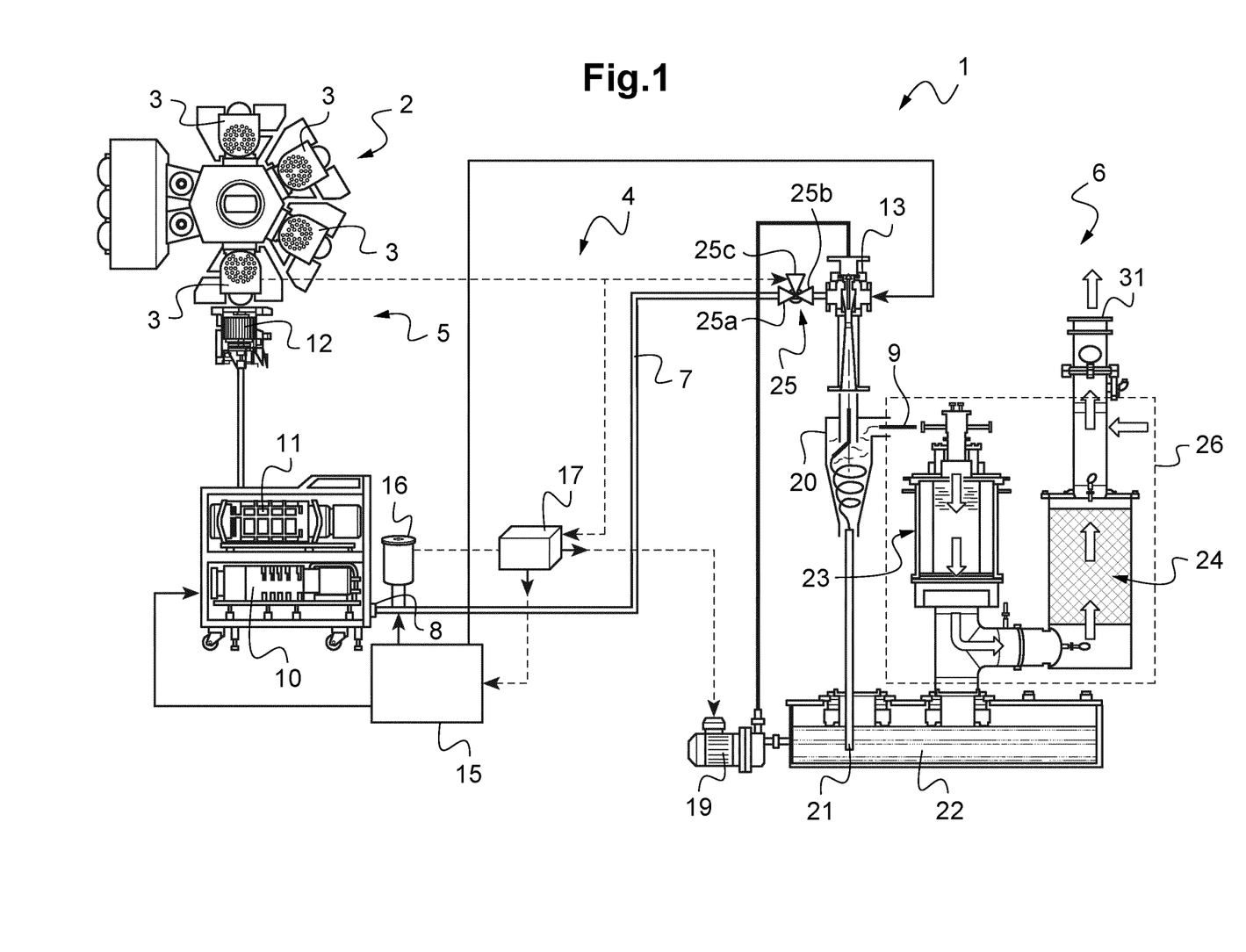
FIG. 1 shows a schematic view of an example of an installation in which only those elements necessary for understanding the invention are shown.

The pumping device 5 includes at least one rough pumping device 10, configured to be able to discharge the pumped gases at atmospheric pressure at the discharge 8 or at a pressure greater than atmospheric pressure, notably up to 1,200 mbar (120,000 Pa), the rough pumping device 10 also being capable of discharging the pumped gases at pressures lower than atmospheric pressure.

The pumping device 5 can also include a high vacuum pumping device, arranged upstream of and in series with the rough pumping device 10 in the direction of flow of the pumped gases, interposed between the process chamber 3 and the rough pumping device 10. The high vacuum pumping device can include a Roots compressor 11 and/or a turbomolecular vacuum pump 12.

The treatment chamber 26 is configured to treat, at atmospheric pressure, the gases pumped by the rough pumping device 10.

In a manner known per se, the treatment chamber 26 includes for example a burner 23 configured to produce thermal reactions at high temperatures by combustion of hydrocarbons and/or an electric system configured to produce thermal reactions at high temperatures by means of heating resistors and/or a plasma and/or a scrubber and/or a chemisorption and/or physisorption cartridge.

According to an exemplary embodiment shown in FIG. 1, the treatment chamber 26 includes a burner 23 and a scrubber 24 arranged in series with and downstream of the burner 23 in the direction of flow of the gases. The burner 23 can be a combustion, electric or plasma burner. A reactive gas, such as oxygen or air, is added to the pumped gases, which are taken to a very high temperature by the burner 23, which activates the formation of new chemically reactive, soluble species that can then be trapped by the scrubber 24. A mist can be generated in the burner 23 by means of water injection nozzles (also commonly known as quench nozzles) in order to cool the gases rapidly and block the chemical equilibria rather than letting the dissociated, hot gases reassociate with each other or react towards an inverted equilibrium. The scrubber 24 includes for example a packed column in which the pumped gases rise in counter-current to a stream of water. At the outlet 31 of the gas treatment device 6, the gases can be discharged into the atmosphere or to a central scrubber of the manufacturing plant.

The gas treatment device 6 further includes at least one auxiliary pumping device 13 configured to lower the pressure in the at least one discharge pipe 7.

The auxiliary pumping device 13 can be of any type. It includes for example a water jet pump (or water blast) as shown in FIG. 1 and/or a Venturi gas jet pump and/or a liquid ring pump and/or a dry vacuum pump, such as a Roots, claw and/or screw vacuum pump and/or a vane and/or scroll and/or membrane or diaphragm pump.

If the auxiliary pumping device 13 includes a Venturi gas jet pump, the driving gas injected to cause a lowering of the pressure can include a neutral gas, such as nitrogen. The driving gas then contributes to further diluting the pumped gases coming from the discharge pipe 7. The driving gas can also include a fuel, such as methane, and/or a comburent. The driving gas then also contributes to further diluting the pumped gases coming from the discharge pipe 7, but without reducing the efficiency of the burner 23 of the gas treatment device 6 and without generating nitrogen oxides.

The Venturi gas jet pump can include a heating element configured to heat the driving gas. The driving gas can be heated, for example to a temperature greater than 50° C., such as greater than 500° C. Heating the driving gas makes it possible to improve the efficiency of the burner 23 of the gas treatment device 6 and makes it possible to prevent the deposition of powder at the jet pump outlet. The driving gas can be heated for example by means of a heat exchanger in contact with hot parts of the treatment chamber 26 or of the pumping device 5, which makes it possible to reduce electricity consumption.

Figure 2A:
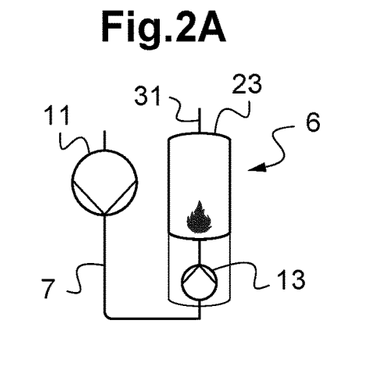
FIG. 2A shows a schematic view of an example of a variant of a vacuum line.

The gas jet pump has the advantage of not consuming electricity. It is compact and light, and can therefore be easily incorporated into the pumping device 5 or into the gas treatment device 6 (FIG. 2A).

If the auxiliary pumping device 13 includes a dry vacuum pump, the purging gas of the dry vacuum pump of the auxiliary pumping device 13 can include a neutral gas, such as nitrogen, and/or a fuel, such as methane, and/or a comburent. The purging gas can further be heated, for example to a temperature greater than 50° C. such as greater than 500° C., for example by means of a heat exchanger in contact with hot parts of the treatment chamber 26 or of the pumping device 5.

The at least one auxiliary pumping device 13 is preferably situated at the inlet 9 of the treatment chamber 26, that is, for example, at a distance of less than 1 metre, such as less than 50 cm, which generally makes it necessary to raise the auxiliary pumping device 13, as the inlet 9 of the burner 23 is generally positioned more than 1.50 m from the ground.

Generally, the pumping capacity of the auxiliary pumping device 13 is preferably less than the pumping capacity of the rough pumping device 10, such as greater than 5 m$^3$/h and/or such as less than 100 m$^3$/h. In these conditions, an auxiliary pumping device 13, notably comprising a dry vacuum pump or a liquid ring pump or a vane pump, can be sufficiently light to be able to be positioned as close as possible to the inlet 9 of the treatment chamber 26 (FIG. 2A), for example in the treatment chamber 26 (FIG. 2B) without any risk and without requiring particular handling means.

Figure 2B:
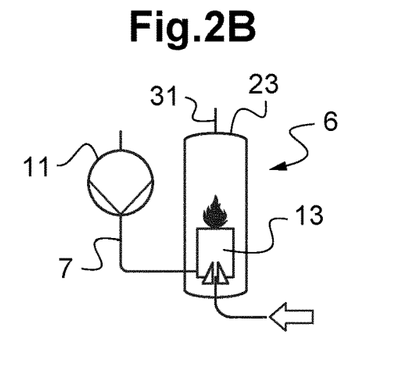
FIG. 2B shows a schematic view of another variant of a vacuum line.

The Venturi gas jet pump auxiliary pumping device 13 is for example mounted in a head of the burner 23 of the gas treatment device 6 (FIG. 2B). The fuel, comburent of the driving gas, is then the gas supplying the flame of the burner 23.

Figure 2C:
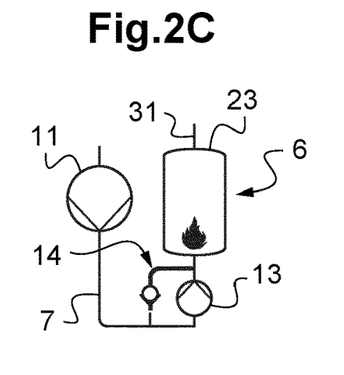
FIG. 2C shows a schematic view of another variant of a vacuum line.

The vacuum line 4 can further include a bypass pipe 14 configured to bypass the auxiliary pumping device 13 (FIG. 2C).

The bypass pipe 14 includes a pipe bypassing the auxiliary pumping device 13 and a controllable valve or a check valve, arranged in the pipe and configured to open or close as a function of the pressure difference on either side of the check valve/valve. The bypass pipe 14 makes it possible to bypass the auxiliary pumping device 13 in order to prevent the pumping capacity restrictions that it can cause, notably in the event of the pumping of strong gaseous streams or in the event of the failure of the auxiliary pumping device 13.

Figure 2D:
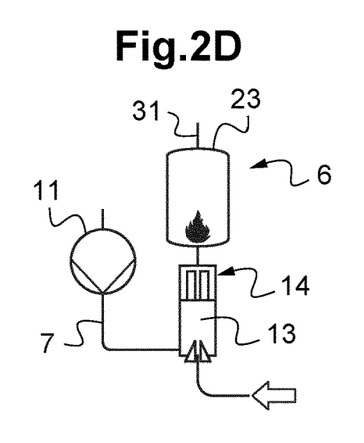
FIG. 2D shows a schematic view of another example of a vacuum line.

When the dry vacuum pump of the auxiliary pumping device 13 includes a Venturi gas jet pump, this can be incorporated into the check valve of the bypass pipe 14 (FIG. 2D). The mobile shutter of the check valve then has a Venturi through-passage. The check valve can adopt a closed position in which the check valve forms the jet pump of the auxiliary vacuum pump 13 when a driving gas is injected at the inlet of the Venturi passage. The check valve can also adopt an open position in which the pumped gases bypass the Venturi through-passage when the pressure difference on either side of the check valve is greater than a loading threshold of the check valve.

Returning to FIG. 1, it can be seen that the vacuum line 4 further includes a diluent gas injection device 15, a pressure sensor 16 configured to measure the pressure prevailing in the discharge pipe 7 and a control unit 17 connected to the pressure sensor 16.

The diluent gas injection device 15 is configured to inject a diluent gas, such as a neutral gas such as nitrogen and/or a fuel, into the stream of the pumped gases, downstream of an intake of the rough pumping device 10, or more specifically downstream of the high vacuum pumping device 11, 12, if applicable, such as into the discharge pipe 7 and/or into the rough pumping device 10 and/or into the auxiliary pumping device 13. The diluent gas is for example injected at the intake and/or discharge 8 of the rough pumping device 10 and/or into the last two pumping stages of a multi-stage rough vacuum pump of the rough pumping device 10 and/or upstream of, downstream of or into the auxiliary pumping device 13.

The pressure sensor 16 is for example arranged at the discharge 8 of the rough pumping device 10.

The control unit 17 includes a controller, microcontroller, memory and computer programs that make it possible to implement a method for controlling the vacuum line. It is for example a computer or a programmable logic controller.

The control unit 17 is configured to control the auxiliary pumping device 13 and the diluent gas injection device 15 as a function of the pressure measured by the pressure sensor 16 according to a first operating mode or according to a second operating mode.

In the first operating mode, the pressure prevailing in the discharge pipe 7 is maintained at less than or equal to 200 mbar (20,000 Pa).

The auxiliary pumping device 13 that makes it possible to lower the pressure in the discharge pipe 7 can be controlled to pump continuously or intermittently.

For example, the auxiliary pumping device 13 includes a Venturi gas jet pump and the control unit 17 is configured to control the driving gas of the jet pump in order to lower the pressure.

According to another example, the auxiliary pumping device 13 includes a water jet pump and the control unit 17 is configured to control the driving liquid of the water jet pump making it possible to lower the pressure (FIG. 1).

In this case, according to one embodiment, the auxiliary pumping device 13 further includes a hydraulic pump 19, an outlet of which is configured to be controlled by the control unit 17 in order to supply the water jet pump with driving liquid. The inlet of the hydraulic pump 19 is for example placed in communication with a liquid of a bath 22 of the scrubber 24 of the gas treatment device 6. The gas treatment device 6 can then include a gas/water separator 20 interposed between the water jet pump of the auxiliary pumping device 13 and the inlet 9 of the burner 23 of the gas treatment device 6. The liquid residues can be discharged to the bath 22 via a plunger tube 21.

In the first operating mode, which is the optimum operating mode, by default, the pressure is thus maintained below the ignition conditions of most of the flammable gases conveyed in the discharge pipe 7.

Figure 3:
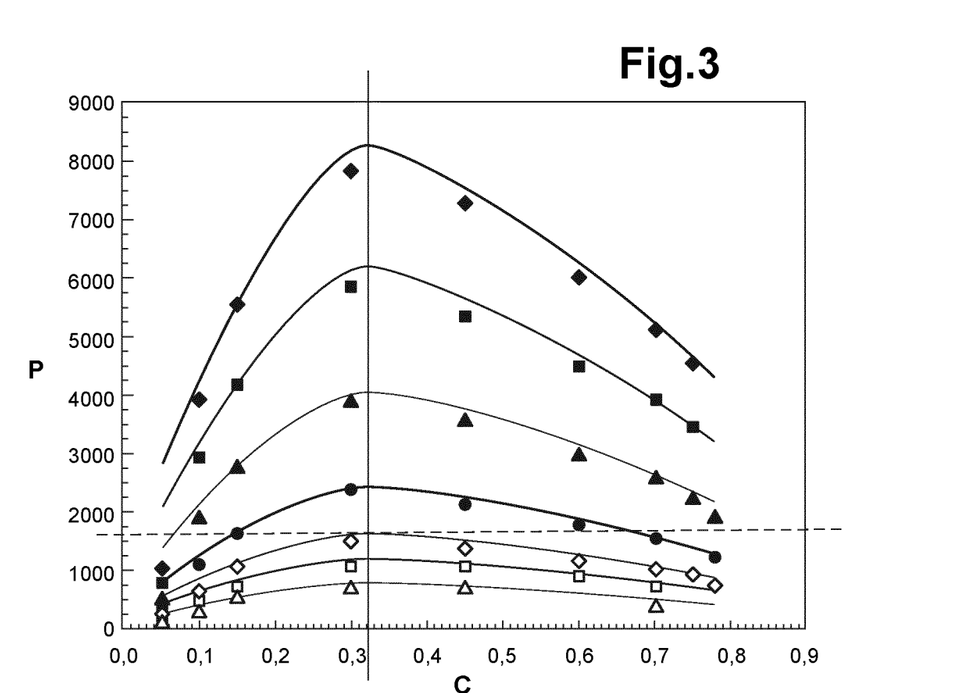
FIG. 3 shows a graph of the explosion pressures P in mbar (the symbols represent the measured values and the solid lines represent the theoretical values) as a function of the concentration C (molecular fraction in the air) of hydrogen for different initial pressure values before explosion: 100 mbar (10,000 Pa) (clear triangles), 150 mbar (15,000 Pa) (solid squares), 200 mbar (20,000 Pa) (clear diamonds), 300 mbar (30,000 Pa) (circles), 500 mbar (50,000 Pa) (solid triangles), 750 mbar (75,000 Pa) (solid squares), 1,000 mbar (100,000 Pa) (solid diamonds).

This can be better understood with reference to the example in FIG. 3, which shows that for pressures of hydrogen gas of 100 mbar (10,000 Pa), 150 mbar (15,000 Pa) and 200 mbar (20,000 Pa), the explosion pressures under stoichiometric conditions, that is, that can lead to the most severe explosion, remain less than 1,600 mbar (160,000 Pa). A set of safe conditions is thus established in the rough pumping device 10 and in the discharge pipe 7, capable of preventing gas explosions. It is considered that, for a pressure less than or equal to 200 mbar (20,000 Pa), the pressure generated by an ignition (also known as explosion pressure) under stoichiometric conditions can easily be contained, that is, it does not cause significant mechanical damage to the pumping device 5 or the pipework. Although FIG. 3 applies to the specific case of hydrogen, the same behaviours are observed for all flammable gases: the explosion pressures under stoichiometric conditions, that is, that can lead to the most severe explosion, remain below 1,600 mbar (160,000 Pa).

In addition, in the first operating mode, there is no need to inject a diluent gas to be outside the flammability and/or explosion conditions, as safety is ensured by the vacuum level at a pressure of less than 200 mbar (20,000 Pa). The control unit 17 can therefore control the stopping of the injection of the diluent gas.

Provision can also be made for the control unit 17 to be configured to switch off the injection of the purging gas into the rough pumping device 10 in the first operating mode. It is thus easier to maintain low pressure in the discharge pipe 7.

The control unit 17 is configured to switch to the second operating mode if it is not possible to lower the pressure to less than 200 mbar (20,000 Pa).

In the second operating mode, the pressure prevailing in the discharge pipe 7 is greater than 20,000 Pa. The control unit 17 is further configured to control the injection of a diluent gas into the stream of the pumped gases, such as into the discharge pipe 7 and/or into the rough pumping device 10 and/or into the auxiliary pumping device 13 by means of the diluent gas injection device 15. In this second operating mode, which can be seen as a "degraded" operating mode, the risk of flammability can be controlled by dilution.

The control unit 17 can be configured so that the flow rate of the diluent gas introduced into the stream of the pumped gases in the second operating mode is determined as a function of the pressure measured by the pressure sensor 16 and as a function of information about the flammable gases to be pumped so that the pressure generated by an ignition (or explosion pressure) remains less than 160,000 Pa (1,600 mbar) notably under stoichiometric conditions, that is, in the flammable gas concentration conditions that reach explosive regimes causing the most devastating effects.

For example, with reference to FIG. 3, it can be seen that when the initial pressure before explosion, measured by the pressure sensor 16, is 300 mbar (30,000 Pa) (circles), the $[H_2]$ concentration of 32% under stoichiometric conditions must be reduced to a target $[H_2]$ concentration, that is, diluted by a neutral gas, of 15%, so that the pressure does not exceed the explosion pressure of 1,600 mbar (160,000 Pa).

According to another example in the figure, when the pressure measured by the pressure sensor 16 is 500 mbar (50,000 Pa) (triangles), the concentration under stoichiometric conditions must be reduced to 6-7% by dilution in order to remain below the explosion pressure of 1,600 mbar (160,000 Pa).

Although these examples describe cases of concentration in stoichiometric conditions, in operation, the flammable gas concentration before dilution is determined in advance by the user, on the basis of a value of the maximum flow of flammable gases introduced into the process chamber 3.

When there are several flammable gases, the neutral gas dilution rate is determined on the basis of the maximum flow rates of flammable gases injected simultaneously into the process chamber 3.

More specifically, a dilution rate is first determined for each flammable gas separately, using a data table specific to each gas as illustrated by the graph in FIG. 3, as a function of the pressure measured by the pressure sensor 16. The data tables can be stored in the control unit 17. Then, the target, that is diluted, concentrations (to be obtained) of each gas are recalculated for all of the flammable gases introduced simultaneously into the process chamber 3; all of the gases injected simultaneously mutually contribute to lowering their respective concentrations.

The dilution rate is thus adjusted as a function of the quantity (flow, pressure) of flammable/explosive gases so that the pressure generated by an ignition (or explosion pressure) remains below 160,000 Pa (1,600 mbar).

The control unit 17 can further be configured to control the injection of a high flow rate of diluent gas into the stream of the pumped gases, downstream of an intake of the rough pumping device 10, such as into the discharge pipe 7 and/or into the rough pumping device 10 and/or into the auxiliary pumping device 13 when the pressure measured exceeds 50,000 Pa (500 mbar). This high diluent gas flow rate can be injected as a priority into the rough pumping device 10 and optionally simultaneously into the discharge pipe 7.

The high diluent gas flow rate is for example predetermined as a function of the maximum flow of flammable gases that can be injected into the process chamber 3. This information is determined in advance by the user, on the basis of a value of the maximum flow of flammable gases introduced into the process chamber. The high diluent gas flow rate is for example predetermined so that the flammable gas concentration is less than 25% of the lower explosive limit (LEL).

The most unfavourable pumping situations are thus made safe, as a function for example of the worst conditions of the recipes implemented in the process chamber 3, plus a safety margin provided by the 25% of the LEL. This is an emergency operating mode, used occasionally in extreme circumstances, similar to permanent practice in the prior art, which resulted in excessive nitrogen consumption in the prior art. Maximum dilution is therefore occasional, which enables savings on diluent gas consumption and on the energy budget.

With reference to FIG. 3, when the hydrogen pressure is greater than 500 mbar (50,000 Pa), the concentration of hydrogen $[H_2]$ can be reduced to values of less than 1% in the discharge pipe 7, that is 25% of the lower explosive limit (LEL) as recommended in the prior art.

In the first operating mode, the control unit 17 thus maintains the pressure in the discharge pipe 7 below 200 mbar (20,000 Pa).

If the pressure measured in the discharge pipe 7 remains below 200 mbar (20,000 Pa), the control unit stays in the first operating mode.

If is it impossible to maintain less than 200 mbar (20,000 Pa) with the auxiliary pumping device 13, notably due to insufficient capacity of the auxiliary pumping device 13, the control unit switches to the second operating mode.

In the second operating mode, the control unit 17 controls the injection of a diluent gas into the stream of the pumped gases, downstream of an intake of the rough pumping device 10, such as into the discharge pipe 7 and/or into the rough pumping device 10 and/or into the auxiliary pumping device 13.

When the pressure is between 200 mbar (20,000 Pa) and 500 mbar (50,000 Pa), the flow rate of the diluent gas introduced into the stream of the pumped gases can be determined as a function of the pressure measured by the pressure sensor 16 and as a function of information about the flammable gases introduced into the process chamber 3, so that the explosion pressure remains less than 1,600 mbar (160,000 Pa), in the most severe explosion conditions in the event of an explosion, such as stoichiometric conditions.

The pressure in the discharge pipe 7 is therefore firstly governed by the capacity of the auxiliary pumping device 13, then by the diluent gas setpoint necessary to dilute the pumped gases as a function of the pressure measured in the discharge pipe 7 and as a function of information about the flammable gases introduced into the process chamber 3, when the pressure measured in the discharge pipe 7 is greater than 200 mbar (20,000 Pa) and less than 500 mbar (50,000 Pa).

If, in the second operating mode, the pressure measured returns to less than 200 mbar (20,000 Pa), then the control unit switches back to the first operating mode.

If the pressure exceeds 500 mbar (50,000 Pa), the diluent gas can be injected, for example directly into the rough pumping device 10, at a predetermined high flow rate value, that is so as to make safe the most unfavourable pumping situations, plus a safety margin.

It will be understood from the above that lowering the pressure in the discharge pipe 7 makes it possible to limit the injection of diluent gas to the most critical situations. As well as making the vacuum line 4 safe, at the same time, lowering the pressure makes it possible to prevent deposits of the condensable species in the discharge pipe 7, which as a result makes it possible to reduce the heating requirements of the lines. In addition, lowering the heating of the lines also makes it possible to avoid thermal decomposition and thus to reduce the conversion of the thermally sensitive precursors in the rough pumping device 10. This combination of a low pressure and a low temperature also makes it possible to reduce the kinetics of the chemical activity, which makes it possible to reduce undesirable chemical reactions, whether they are corrosive or capable of clogging the elements of the vacuum line 4. Lowering the heating also makes it possible to preserve the quality of the lubricants and improve the reliability of the mechanical parts of the rough pumping device 10, notably the bearings. The intervals between maintenance operations can therefore be significantly increased, which improves the economic profitability of the vacuum line 4 and the uptime of the production equipment. Still from an economic point of view, the use of costly noble materials can also be reduced. The elements of the rough pumping device 10 can be standardized in terms of both design and materials, which simplifies the offering and makes it universal.

In addition, the consumption of diluent gas is limited, which also makes it possible to reduce the energy consumption of the rough pumping device 10 and, at the same time, of the gas treatment device 6 and to minimize, or even eliminate, the formation of nitrogen oxides in the gas treatment device 6.

According to an exemplary embodiment shown in FIG. 1, the gas treatment device 6 can also include at least one bypass device 25 interposed between the discharge pipe 7 and the auxiliary pumping device 13.

The bypass device 25 comprises an inlet port 25a connected to the discharge pipe 7, a first outlet port 25b connected to the auxiliary pumping device 13 in turn connected to the treatment chamber 26, a second outlet port 25c configured to bypass the treatment chamber 26 and a control member configured to place the inlet port 25a in communication with the first outlet port 25b or the second outlet port 25c. The bypass device 25 is for example a controllable three-way valve.

The bypass device 25 makes it possible to bypass the auxiliary pumping device 13 and the treatment chamber 26, via the second outlet port 25c, only when the pumped gases do not need to be treated. They can thus be directed towards the central scrubber of the manufacturing plant.

The control member can be a manual member. The maintenance operators can operate the control member during maintenance to divert the gases from the treatment chamber 26 during a maintenance operation on the chamber for example. Thus, in the event of the failure or maintenance of the burner 23 for example, the pumped gases can be redirected by the bypass device 25.

The control member can select the first or the second outlet port 25b, 25c, for example as a function of an item of information from the process chamber 3, such as the status of the process chamber 3 (treating, off or on standby) or such as an item of information indicating whether the gases must be treated or not. For example, the gases coming from a process chamber 3 that is off or on standby, can thus not be treated and bypass the burner 23 via the bypass device 25. The information, such as a dry contact or a pneumatic control, can directly control the switching of the control member.

There is for example one bypass device 25 per process chamber 3 and several process chambers 3 per apparatus 2.

Several process chambers 3, and therefore several bypass devices 25, can further be connected to a single treatment chamber 26. The second outlet ports 25c of the bypass devices 25 can further be associated on a common pipe 35.

The invention claimed is:

1. A vacuum line comprising:
a pumping device including at least one rough pumping device configured to be able to discharge pumped gases at atmospheric pressure;
a gas treatment device comprising:
a treatment chamber configured to treat, at atmospheric pressure, the gases pumped by the rough pumping device,
a discharge pipe connecting a discharge of the rough pumping device to an inlet of the treatment chamber,
at least one auxiliary pumping device configured to lower the pressure in the discharge pipe, and
a diluent gas injection device configured to inject a diluent gas into a stream of the pumped gases, downstream of an intake of the rough pumping device;
a pressure sensor configured to measure the pressure prevailing in the discharge pipe; and
a control unit configured to control the auxiliary pumping device and the diluent gas injection device according to a first operating mode in which the pressure prevailing in the discharge pipe is maintained at less than or equal to 20,000 Pa or according to a second operating mode in which the pressure prevailing in the discharge pipe is greater than 20,000 Pa, the control unit being configured to control the injection of the diluent gas by the diluent gas injection device in the second operating mode.

2. The vacuum line according to claim 1, wherein the control unit is configured so that a flow rate of the diluent gas introduced into the stream of the pumped gases, downstream of an intake of the rough pumping device, in the second operating mode is determined as a function of the pressure measured by the pressure sensor and as a function of information about flammable gases to be pumped so that the pressure generated by an ignition remains below 160,000 Pa.

3. The vacuum line according to claim 2, wherein the diluent gas is introduced into the stream of the pumped gases in the discharge pipe, in the rough pumping device, or in the auxiliary pumping device.

4. The vacuum line according to claim 1, wherein the diluent gas includes a fuel and/or a neutral gas.

5. The vacuum line according to claim 1, wherein the control unit is configured to control the injection of a high flow rate of diluent gas into the stream of the pumped gases, downstream of an intake of the rough pumping device, when the pressure measured exceeds 50,000 Pa.

6. The vacuum line according to claim 5, wherein the high flow rate of diluent gas is predetermined so that a concentration of a flammable gas is less than 25% of a lower explosion limit.

7. The vacuum line according to claim 5, wherein the high flow rate of diluent gas is injected into the stream of the pumped gases in the discharge pipe, in the rough pumping device, or in the auxiliary pumping device.

8. The vacuum line according to claim 1, wherein the control unit is configured to switch off an injection of a purging gas into the rough pumping device in the first operating mode.

9. The vacuum line according to claim 1, wherein the auxiliary pumping device includes a water jet pump and/or a Venturi gas jet pump and/or a liquid ring pump and/or a dry vacuum pump and/or a vane pump.

10. The vacuum line according to claim 1, wherein the treatment chamber includes a burner and/or an electric system and/or a plasma and/or a scrubber and/or a chemisorption and/or physisorption cartridge.

11. The vacuum line according to claim 1, wherein the auxiliary pumping device includes a Venturi gas jet pump, a driving gas of which includes a fuel and/or a comburent and/or a neutral gas.

12. The vacuum line according to claim 11, wherein the Venturi gas jet pump includes a heating element configured to heat the driving gas.

13. The vacuum line according to claim 1, wherein the auxiliary pumping device is situated less than 1 metre from the inlet of the treatment chamber.

14. The vacuum line according to claim 1, wherein the auxiliary pumping device is situated less than 50 cm from the inlet of the treatment chamber.

15. The vacuum line according to claim 1, wherein the auxiliary pumping device includes a water jet pump and a hydraulic pump an inlet of which is placed in communication with a liquid of a bath of a scrubber of the gas treatment device and an outlet of which is configured to be controlled by the control unit to supply the water jet pump with driving liquid.

16. The vacuum line according to claim 1, further comprising a bypass pipe configured to bypass the auxiliary pumping device in an event of overpressure.

17. The vacuum line according to claim 1, wherein the diluent gas is injected into the discharge pipe and/or into the rough pumping device and/or into the auxiliary pumping device.

18. A method for controlling the vacuum line according to claim 1, comprising:
  controlling the auxiliary pumping device and the diluent gas injection device according to a first operating mode in which the pressure prevailing in the discharge pipe is maintained at less than or equal to 20,000 Pa (200 mbar) or according to a second operating mode in which the pressure prevailing in the discharge pipe is greater than 20,000 Pa, and
  controlling the injection of the diluent gas into the stream of the pumped gases, downstream of an intake of the rough pumping device, by the diluent gas injection device in the second operating mode.

19. The method according to claim 18, wherein the diluent gas is injected into the discharge pipe and/or into the rough pumping device and/or into the auxiliary pumping device.

* * * * *